July 16, 1935.　　　　　C. VINCENT　　　　　2,008,231
METHOD FOR OPERATING THE TRANSMISSION OF MOTOR VEHICLES
AND DRIVING MECHANISM FOR CARRYING OUT THE SAME
Filed Jan. 13, 1933　　　2 Sheets-Sheet 2

Inventor
C. Vincent

Patented July 16, 1935

2,008,231

UNITED STATES PATENT OFFICE 2,008,231

METHOD FOR OPERATING THE TRANSMISSION OF MOTOR VEHICLES AND DRIVING MECHANISM FOR CARRYING OUT THE SAME

Charles Vincent, Brussels, Belgium

Application January 13, 1933, Serial No. 651,645
In Belgium January 15, 1932

7 Claims. (Cl. 74—336.5)

Transmission gears actually in use on motor vehicles generally comprise three or four transmission ratios which are chosen so as to allow, at least theoretically, for every speed imparted to the vehicle an engine speed consistent with the regular operation of the engine. But it will be readily understood that these ratios do not always allow the engine speed corresponding to the maximum power which should be produced in accordance with the consumption of fuel. To obtain the desired result it is necessary to use a progressively acting transmission mechanism.

According to my invention the ratio between the driving and the driven shafts of the transmission is automatically and continually varied, so that whatever be the engine torque required to drive on the vehicle, the said engine will, at any position of the throttle valve, turn at an exactly determined speed and which is equal to the velocity at which the engine normally produces the maximum power for the opening of the throttle valve considered. Consequently, the thus determined speed of the engine will remain constant as long as the position of the accelerator is not varied.

This being so, it is desirable that,—from the instant the driver by acting upon the accelerator has caused the engine to have a fuel consumption corresponding to the power he wants to obtain,—the ratio of transmission be adjusted without the driver's interference, i. e. automatically.

Several devices may be used for carrying out the controlling method of the kind mentioned, the accompanying drawings showing diagrammatically and by way of example four embodiments of such devices.

Figure 1:
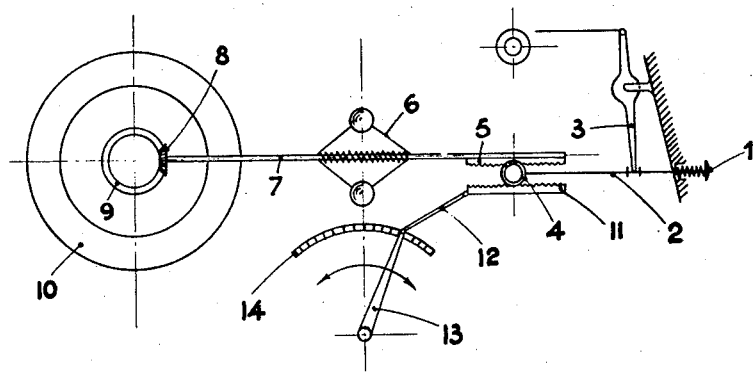
Fig. 1 illustrates one embodiment of the invention.

According to the first embodiment shown in Fig. 1, the accelerator pedal 1 acts upon a rod 2 having linked to it a lever 3 which operates the throttle valve of the carburetor. The extension of the rod 2 is provided with a pinion 4 meshing with two racks. The upper rack 5 is connected to a governor 6 which is in turn connected by means of a rod 7 to a bevel pinion 8 meshing with a corresponding pinion 9 on the vehicle wheel 10. The lower rack 11 is connected by means of a rod 12 to a lever 13 forming part of the transmission mechanism. The lever 13 moves along a segment 14 adapted to determine the various positions of said lever corresponding to the ratios higher or lower than the one to one ratio.

It will be easily understood that the relative displacements of the rack 5 and pinion 4 will cause a corresponding displacement of the rack 11, and consequently, a change in the transmission ratio.

Thus, if, the vehicle being started from stopped position, the driver pushes the accelerator pedal to its final depressed position, the transmission ratio wanted at that time is the maximum from high to low ratio obtainable. This is also true when the vehicle is driven on an extremely steep slope upward while, on a flat road the transmission will be shifted to direct drive in a few instants. On the contrary, when the driver runs up a hill without modifying the position of the accelerator, the slowing down of the vehicle will cause the transmission ratio to get lower and lower from high owing to the fact that the governor 6 pushes the rack 5 backward until the latter stops, which corresponds to a state of equilibrium.

An adjusting device is thus obtained which may act as to compare the speed of the vehicle to the position of the accelerator pedal.

Figure 2:
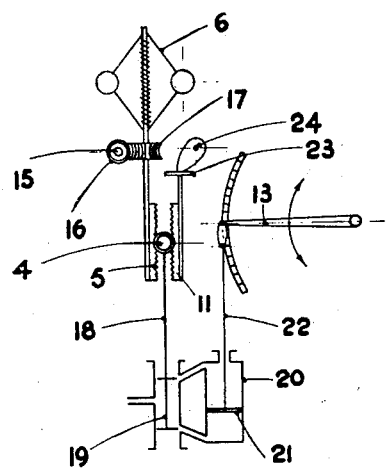
Fig. 2 illustrates a second embodiment of the invention.
Figure 3:
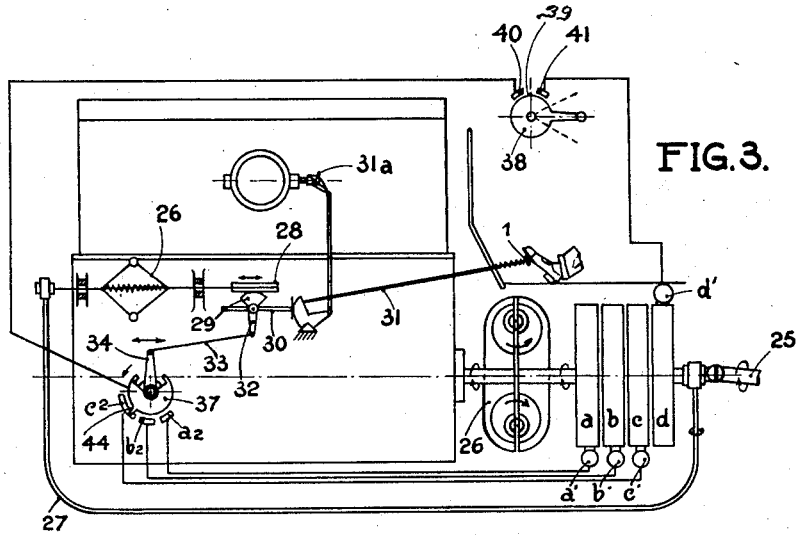
Figs. 3 and 4 illustrate two other embodiments of the invention as applied to a nonprogressively acting drum transmission.

According to the embodiment shown in Fig. 2, the member acted upon by the position of the accelerator acts in combination with a member controlled by the velocity of the engine, to operate a lever or other suitable member determining the modification of speed ratio in the progressively acting transmission mechanism.

As will be seen, the camshaft 15 of the engine drives through a worm 16 a pinion 17 integral with a governor 6. The spindle of the pinion 17 has connected to it a rack 5 in mesh with a pinion 4 meshing in turn with a second rack 11. The pinion 4 is connected to the driving rod 18 of the distributor 19 of an auxiliary motor 20 the piston 21 of which drives by its rod 22 a lever 13 forming part of the transmission mechanism such as in the aforesaid embodiment. On the other hand, the rack 11 is integral with a plate 23 adapted to be acted upon by a cam 24 the revolution of which is controlled by the accelerator.

It will be easily understood that the position of lever 13 will be varied to obtain the desired transmission ratio, according to the relative movements of the racks 5 and 11.

The outline of the cam 24 will be designed according to the desired relationship between the opening of the accelerator and the numbers of turns of the engine.

The latter adjusting device is more simplified than the preceding one but is also less sensitive, as it does not enter in action before the engine is influenced by the increased resistance. The result is influenced by this lag to some extent.

The controlling method according to this invention may be used with any type of progressively acting transmission, and the member determining the transmission ratios may be operated either directly or by means of a servo-motor when the effort required is too great.

The controlling method just described may be applied to nonprogressive transmission systems, such as planetary and differential wheels and wherein the drums are clamped mechanically, hydraulically, electrically, by vacuum or by any other means.

This result is obtained by allowing the member influenced by the fuel consumption rate of the engine and by the driving speed of the vehicle to act upon a switch or equivalent device which will cause clamping of the drum adapted to give the most suitable speed. Various switching devices may be carried out to produce this result according to the clamping means for the drums, which may consist of one of the above described mechanisms.

Two such embodiments are hereinafter described and illustrated in Figures 3 to 7 of the accompanying drawings.

The driving shaft 25 carries a centrifugal clutch 26 as well as a transmission mechanism consisting of drums, $a$, $b$, $c$, $d$ enclosing reducing gears and which may be clamped by the corresponding electro-magnets $a'$, $b'$, $c'$ and $d'$. The driving shaft 25 is connected to the governor 26 by means of a flexible driving connection 27. The rack 28 connected to the governor 26 is in mesh with a toothed segment 29 actuated by a rod 30 actuated in turn by the operating rod 31 of the accelerator. The segment 29 has an extension 32 which is connected through a rod 33 to a lever 34 forming part of the switching or contact making device.

The lever 34 is idly mounted on its spindle and is adapted to oscillate between two adjustable abutments 35 and 36 provided on a disc 37 interposed in an electrical circuit controlled by a hand lever 38 mounted on the steering wheel. The brush 39 of this hand lever may thus contact the block 40 in forward drive, or the block 41 connected with the electro-magnet of the transmission gear, in reverse drive. When the vehicle is stopped or free-wheeling, the brush 39 occupies an intermediate position between the blocks 40 and 41.

The lever 34 cannot contact any one of the abutments 35, 36 without compressing one of the springs 42, 43 which are also provided on the disc 37, which disc may rotate freely upon the spindle of the lever 34 and is provided with the brush 44 of convenient shape and material. The brush 44 is applied against one of the blocks $a^2$, $b^2$ or $c^2$, with sufficient strength to ensure contact with one of the latter, while allowing compression of the springs 42, 43, when the lever 34 of the switch is operated.

To produce the rotation of the disc 37 it is necessary that the latter be driven by the lever 34, which will take place when this lever, after having compressed the spring 42 will strike against the abutment 35. If, under the action of the rod 33, the lever 34 will continue to oscillate, the disc 37 will also be rotated and its brush will reach, in the case of Fig. 5, the end of block $b^2$. When continuing its displacement, the brush will come off the block $b^2$, at which time, the resistance produced by the friction of the brush against the block being relieved, the disc 37 which has become free, is quickly pushed back by the compressed spring 42. At the same instant the brush comes into contact with the block $c^2$, thus causing the change of speed ratio resulting from the closing of the circuit of the electro-magnet $c'$.

It is well understood that the distance the blocks of the switch are spaced apart is provided so that when the springs 42, 43 expand, they act so as to ensure contacting of the brush with the adjacent block. Moreover, the inertia of the disc 37 assists this action of the springs to some extent. The number of blocks will of course depend from the number of speeds, which will also determine the length of the blocks.

Figure 4:
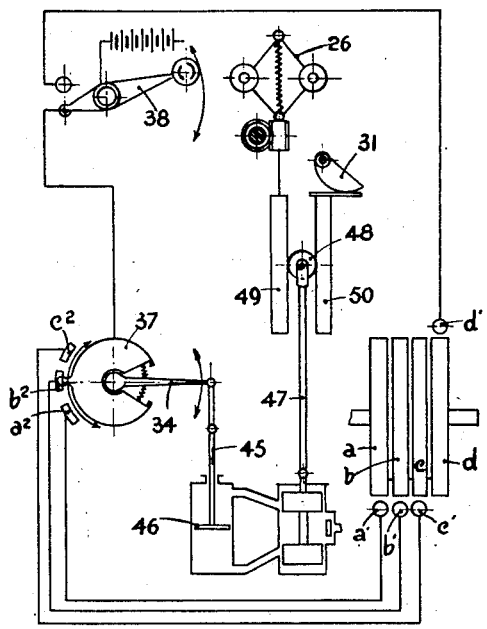
Figure 5:
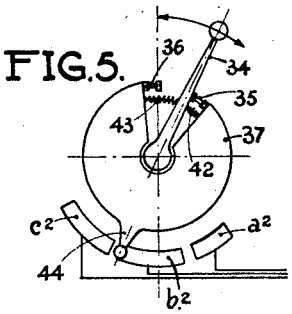
Figs. 5 and 6 illustrate the switch mechanism adapted to control the clamping of the drums.
Figure 6:
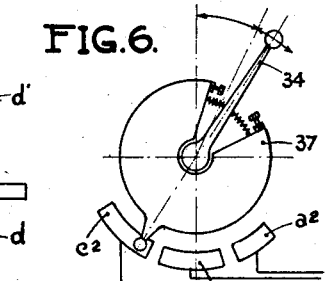
Figure 7:
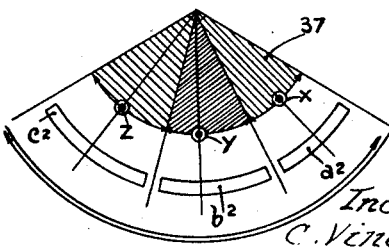
Fig. 7 is a detail view to a larger scale.

The contacting device is arranged in like manner in the mechanism shown in Fig. 4, which corresponds to that shown in Fig. 2. The only difference is that lever 34 is provided at the end of rod 45 and is connected to piston 46 of the servo-motor, the distributor of the latter being actuated by a rod 47 connected to a pinion 48 meshing with the racks 49 and 50 which are acted upon by the governor 26 and operating lever 31 of the accelerator, respectively.

To better understand the function of the contacting device for automatically operating the shifting of gears in motor vehicles, it is necessary to bear in mind that the gear shifting mechanism according to the two latter embodiments is not progressively acting, and consequently there is not an infinite number of speed ratios available. It should therefore be admitted that in certain moments the reduced speed ratio will not be an optimum, i. e. will not allow the engine to turn at a velocity where it produces the maximum power when considering the position of the accelerator at the time given. One speed (the third) may not be the optimum one, while being more suitable than any other speed available (first, second). Consequently no change of speed should take place until the second speed will be found more suitable than the third. Moreover, the shift will have to be accomplished instantaneously and quickly.

Supposing the engine is slowing down, if the accelerator pedal is briskly depressed, the disc 37 is pivoted to the end of its stroke and the brush 39 engages the block $a^2$. At the same time the engine speed is increased, the clutch is engaged and the vehicle is started, while the governor 26 begins to open. During a short period of time, the transmission ratio corresponds to the ideal ratio between the engine and the driven parts, and according to Fig. 7, the ideal point for the block $a^2$ will be at X. While the speed of the vehicle increases, the ideal ratio gradually increases so as to come nearer to the second speed. One instant later there is an equivalency between the first and second speed, none of them being ideal, as the first speed is too low and the second speed is too high. This is the hesitating period which is determined by the interval between two adjacent blocks, but the vehicle, when accelerating avoids any hesitation owing to the fact that the governor causes the disc 37 to advance. In the meanwhile the optimum ratio has increased, i. e. that the second speed has become the optimum one (point Y) and the brush 39 engages the block $b^2$. The ratio is not perfect, but as the speed of the vehicle increases said ratio finally becomes perfect, after which it overruns the optimum point. Another hesitating period is then interposed between the blocks $b^2$ and $c^2$, after which the third speed becomes the optimum one (point Z) and so on.

In case of shifting from high to lower speed, the above described phases occur in an inversed order. When the vehicle is driving up hills the engine slows down, as well as the vehicle, though the position of the accelerator is not modified. Consequently, the governor is again closed. As soon as the vehicle has reached the speed for which, considering the opening of the accelerator, the second speed ratio is more favourable to the generation of power, the brush passes from block $c^2$ to block $b^2$ and the motor drives again with full power, and so on.

It will be interesting to consider the following case.

When the vehicle runs at full admission, at say 100 km. per hour, in direct drive or third speed, and the driver suddenly releases the accelerator (Fig. 3), the rod 30 then moves backwards towards the right and the segment 29 meshing with the rack 28 also moves backwards towards the right. The contacting device then rotates in a clockwise direction, the brush slides on block $c^2$ and may come off the latter. At this instant all the connections are cut and the vehicle is freewheeling. Thus, freewheeling is only obtained on a road when the vehicle is driven at a high speed. When driving at low speed, the braking drag of the engine is automatically used without ill-timed freewheeling.

As in the case of Figs. 1 and 2, the method proposed and carried out according to the embodiments of Figs. 3 to 7 with or without contacting device, permit to obtain at every instant the reduced ratio allowing the engine to rotate at a speed corresponding to the fuel consumption rate chosen by the driver, the ratio being more reduced in proportion as the vehicle moves at a lower speed and as the engine is wanted to rotate at a higher velocity, more as the throttle valve is opened.

What I claim is:

1. A transmission operating device comprising means for changing the gear ratio of the transmission, an operator therefor, a cooperating operator controlled by the velocity of the vehicle, an element connecting and compelling relative opposite movement of the operators, and means for manually controlling said element.

2. A transmission operating device as claimed in claim 1, wherein the means for manually controlling the element includes means for governing the speed of the engine.

3. A transmission operating device as claimed in claim 1, wherein the means for manually controlling the element includes an accelerator pedal.

4. A transmission operating device comprising means for changing the transmission gears, a rack connected to said means, a second rack mounted above the first rack for reciprocation, said reciprocation being controlled by the velocity of the vehicle, a pinion mounted between said racks and in mesh with the racks and mounted for movement parallel to the racks, and means controlling the speed of the engine also controlling the movement of said pinion.

5. A transmission operating device as claimed in claim 4, wherein the means controlling the operation of the pinion includes the accelerator pedal.

6. A transmission operating device according to claim 1, wherein the operator for the means for changing the gear ratio includes a hydraulic piston and a valve for controlling same.

7. A transmission operating device according to claim 1, wherein the operator for the means for changing the gears includes an electro-magnetic means and switch for controlling same.

CHARLES VINCENT.